Figures 1, 2, 3:
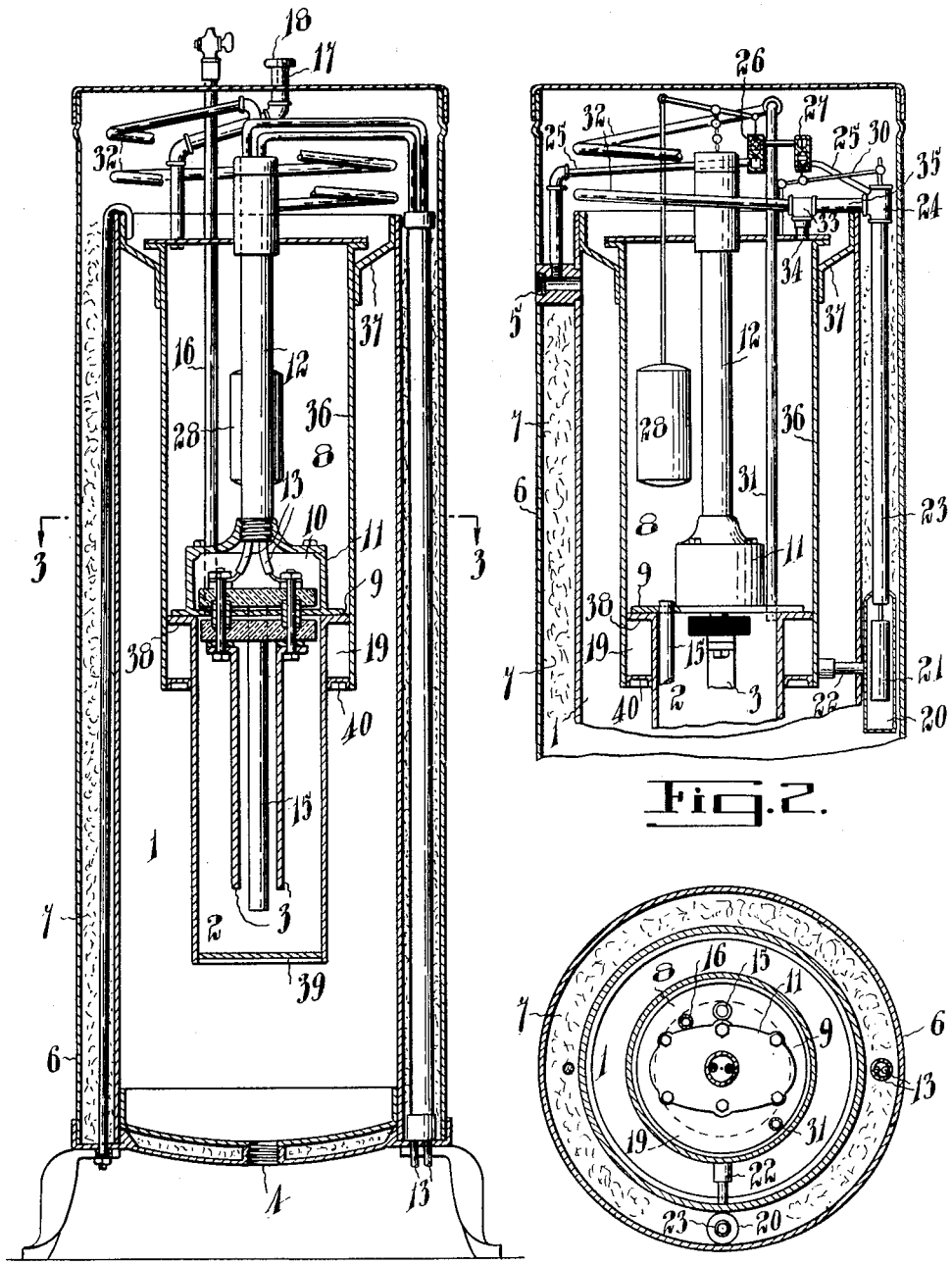

March 6, 1934.  M. W. KIRKWOOD  1,950,113

ELECTRIC WATER HEATER

Filed July 29, 1932

Inventor
M.W. Kirkwood
by J. Edw. Maybee
ATTY

Patented Mar. 6, 1934

1,950,113

UNITED STATES PATENT OFFICE 1,950,113

ELECTRIC WATER HEATER

Matthew W. Kirkwood, Preston, Ontario, Canada

Application July 29, 1932, Serial No. 625,751

19 Claims. (Cl. 219—40)

This invention relates to electric water heaters of the type in which water is heated by the passage of current through the water between submerged electrodes, and more particularly to heaters in which regulation of the flow of current is obtained by causing generated steam to vary the water level and consequently the extent of submergence of the electrodes, and my object is to devise a compact, simple and efficient heater of this type in which the electrolyte employed is a body of distilled water which does not mingle with the water heated for consumption, and to provide means for automatically replenishing the distilled water as required.

I attain my object by means of the constructions which may be briefly described as follows: Within a main supply tank is positioned a closed heating chamber above which is positioned a surge tank entirely separated from the interior of the supply tank. A surge pipe extends from the bottom of this tank to a point within the heating chamber adjacent its lower end. From the top of the heating chamber depend the electrodes, their terminals being enclosed in a housing at the bottom of the surge tank from which a conduit for wiring extends up through the surge tank and thence to the exterior of the apparatus.

Initially the heating chamber and the surge tank are filled with distilled water up to a predetermined level.

Surrounding the top of the heating chamber is an evaporating chamber in which steam may be generated and subsequently condensed to supply condensed water to the surge tank. Automatic means are provided to supply feed water to the evaporating chamber as needed and in accordance with the requirements of the heating chamber and surge tank for the replenishment of their contents of distilled water.

The invention is hereinafter more fully described and is illustrated in the accompanying drawing in which Fig. 1 is a vertical section of the apparatus;

Fig. 2 a vertical section of the upper part of the apparatus taken at right angles to Fig. 1; and Fig. 3 a cross section on the line 3—3 in Fig. 1.

In the drawing like numerals of reference indicate corresponding parts in the different figures.

This automatic electric water heater, has been developed on the principle that the natural resistance of water to the flow of electricity, produces heat.

The heater includes two main parts, one of these being the water tank (1) for the storage of the hot water supply, and the other, which may be termed the heating unit, made up of three separate and distinct chambers—a heating chamber 2, a surge tank 8, and an evaporating chamber 19 built into the centre of the water tank (1). While these two main parts are not in communication with one another, the heat produced by the resistance of the water in the heating chamber (2) which is one of the three constituting the heating unit, to the flow of the electric current passing between electrodes (3), is radiated and causes the water in the outer tank (1), to become heated. Thus, when cold water is admitted into the water tank through the inlet (4) at the bottom it absorbs heat given off from the heating chamber (2), and is drawn off as hot water at the outlet (5), at the top of the tank. A feature to be noted, however, is that the problem of variable resistance in waters having different analyses, has been overcome in this heater, by the adoption of distilled water or similar suitable electrolyte, as the conductor of electric current in the heating chamber.

A metal casing enclosing the water tank (6) leaves adequate space between for insulating material (7) to prevent the radiation of heat to the atmosphere.

Of the three chambers comprising the heating unit, the first or topmost is a surge tank or expansion chamber (8) which is intimately related through its function, to the heating chamber (2) immediately below it. This tank is formed by a cylindrical shell (36) which passes through and is secured to the annular top (37) of the water supply tank. Above its lower end is secured an annular partition 38, the opening of which is closed by the bottom of the housing 11. The heating chamber 2 is secured to the annular partition and is of smaller diameter than the surge tank and is closed at the top by the base (9) of the housing (11) and at the bottom by the plate (39). An annular partition (40) connected to the shell (36) and the wall of the heating chamber forms the bottom of the evaporating chamber (19), the top being formed by the partition (38). The heating tank contains two or more electrodes (3) suspended from the base of the housing (11). These electrodes (3) are insulated from the base (9) of the housing, the upper insulation (10) being contained in the housing (11) at the bottom of the surge tank (8), from which housing a conduit pipe (12), carrying the electrical connections (13), extends to the top of the heater. These leads are then brought down to the bottom of the heater in a conduit between the supply tank (1) and the outer casing (6) where they are connected to the service. The heating chamber (2) communicates with the surge tank (8) by means of a surge pipe (15) having one end opening into the bottom of the latter tank (8), the pipe continuing down into the heating chamber (2) so that its lower end is below the bottom of the electrodes (3).

Provision is made for the drawing off of any air which may be trapped at the top of the heating chamber (2) by a small valve-controlled pipe (16) vented to the atmosphere at the top of the heater. In addition, a pipe (17) extending from the top of the surge tank (8) is open at its upper end through a small breathing port, shown as part #18, and this allows air to pass into or out of the surge tank with variations in the water level therein.

Surrounding the upper end of the heating chamber (2) in such a way that its outer side is formed by the extension of the wall of the surge tank (8), is the third or evaporating chamber (19), which is part of the equipment for the production of distilled water, used in the operation of the heater to replace waste. The operation of the evaporating chamber and its associated parts, the purpose of which is to maintain an adequate supply of distilled water, is discussed in detail below.

Before the heater commences to operate, there must be enough distilled water in the heating unit to completely fill the heating chamber (2) and also to fill the surge tank (8) up to a predetermined level adapted to provide a sufficient margin for satisfactory performance. This water may be poured in at the top of the heater, through the pipe 17 after removal of the removable plug (18) and at the same time, the air which would otherwise be trapped in the heating chamber (2) is drained off through the vent (16) thus allowing the chamber to become entirely filled with electrolyte.

With the passing of the electric current from one electrode (3) to another through the distilled water in the heating chamber (2), the temperature of the water rises to the boiling point, and vapor forms at the top of the heating chamber (2). The expansion of this vapor forces the water down in the heating chamber, more or less baring the electrodes (3) and up through the surge pipe (15) into the surge tank (8) thus automatically reducing the flow of the electric current from electrode to electrode. Meanwhile the colder water in the supply tank (1) surrounding the heating chamber (2) causes the vapor to condense, which allows the water forced up into the expansion tank (8) to run back by gravity through the surge pipe (15), thus increasing the flow of electricity between the electrodes (3). This in turn, causes more vapor to form in the top of the heating chamber (2), the expansion of which again forces the water up into the surge tank (8). At the same time the condensation of the vapor due to the lower temperature of the water in the supply tank (1) also proceeds as before. The fact that the surge pipe (15) connecting the heating chamber (2) with the expansion chamber (8) extends below the bottom of the electrodes (3) makes it possible for the water to be forced away from the electrodes (3) entirely, should enough vapor be formed and this would reduce the flow of electricity to zero. The action in the heating chamber (2) tending towards the formation of vapor, automatically reducing the current, is counteracted by the effect of the colder water surrounding the heating unit in condensing the vapor and increasing the current flow. These conflicting tendencies cause the distilled water in the heating unit to be continually surged out, and then to run back again, though gradually with less frequency, because of the slower condensation of the vapor as the temperature of the water in the supply tank (1) is raised to that in the heating chamber (2). When the water in the tank (1) becomes as hot as that in the heating chamber (2) that is, when it reaches the boiling point, the vapor holds the distilled water up in the surge tank (8). Only enough water remains in the heating chamber (2) as will allow that amount of current to be conducted between the electrodes (3) which will maintain the temperature of the water in the supply tank, at the maximum point to which it has been brought.

If hot water is drawn off at (5) and cold water comes into the tank at (4), it causes the vapor in the heating chamber (2) to be condensed more rapidly again, and this permits a greater flow of current to pass between the electrodes (3) as the water flows back from the expansion chamber (8). The surging action of the distilled water in and out of the heating chamber (2) then continues as described above until the water in the tank (1) is again raised to the same temperature as that in the heating chamber (2). From this, it will be seen, that only that amount of electric current required to heat the water, and to keep it hot, is consumed, and this amount is automatically controlled by the temperature of the water in the supply tank (1), which depends on the extent of withdrawal of hot water.

In the normal operation of the heater, there is a tendency for the quantity of distilled water in the heating unit (2) and (8) to decrease through evaporation. This evaporation is in part natural, and in part is caused by the continual fluctuation in the volume of air contained in the surge tank (8) which varies inversely, with the quantity of distilled water in the surge tank. That is, when water is surged from the heating chamber (2) into the expansion tank (8), the moisture-laden air in the latter tank, is compressed, and since the expansion tank is open to the atmosphere through a breathing port 18 at the top, the air will pass out where there is less pressure exerted on it, and in so doing, carries off some very minute portion of the water with it. On the other hand when the vapor in the heating chamber (2) condenses in the process of heating the domestic water supply in the tank (1), the distilled water in the surge chamber (8) flows back, and air, with a lower degree of humidity, is breathed in at (18) to take up the vacated space, as the pressure on the air in the surge tank (8) is reduced. Because of this ceaseless variation in the volume of water and air in the surge tank (8) there results the gradual loss of distilled water, and means have been provided for automatically supplying distilled water to make up this loss as it is required.

The apparatus which automatically maintains the supply of distilled water in the heater, consists in part, of the evaporating chamber 19 mentioned above, and shown in the drawing. This chamber #19, is located directly below the surge tank (8) and completely encircles the upper end of the heating chamber (2). In this position it is placed in the area where the highest temperature is likely to prevail, because of the frequency with which steam is produced in the top of the heating chamber (2).

Between the supply tank (1) and the outer casing (6) is a small chamber or float tank (20) containing a float (21). This float tank (20) situated at approximately the same elevation as the vaporizing chamber (19) is connected to it by a small pipe 22, which permits of the same level of water in both tanks. Extending from the upper end of the float tank (20) to the top of the heater, is a pipe (23) which is connected by means of the fitting (24) to a small feed pipe (25), and this latter is produced to connect with the hot water outlet (5).

Introduced into feed pipe (25) are two valves 26 and 27 which control the flow of water from the domestic supply outlet (5) to the vaporizing chamber (19). A float 28 inside the surge tank (8) operates valve (26) in such a manner that when the level of the distilled water in the surge tank subsides below a predetermined minimum, the float (28) drops sufficiently to cause the valve (26) to open. Similarly, when the level of the distilled water in the surge tank (8) rises, it brings the float (28) up until a certain point is attained, whereupon the valve (26) is closed.

The float (21) contained in the float tank (20) operates the valve (27) in response to the level of the water in the vaporizing chamber (19) which is the same as that in the float tank (20). When the level of the water in the float tank (20) allows the float to drop to a certain point, the valve (27) is opened and remains so until enough water has been permitted to flow from the hot water outlet (5) through the small feed pipe (25) containing the two valves (26) and (27) and through the float tank (20) into the vaporizing chamber (19) to raise the level of the water in the float tank (20) sufficiently, so that the float (21) will raise and close the valve (27). In the drawing the ordinary link and lever system (29) is shown as connecting the valve (26) and float (28), and the link and lever system (30) as connecting the valve (27) and float (21).

Extending up from the evaporating chamber (19) through the surge tank (8) to the top of the heater, is the pipe (31), which is connected to a condensing coil (32) at the top of the heater. This coil, the purpose of which is to condense the vapor rising from the evaporating chamber (19) is connected at its other end, by means of a fitting (33), to a pipe (34), which carries the distilled water into the surge tank (8). The pipe (35), which extends from the fitting (24) of the pipe (23) from the float tank (20), across to the fitting (33), where the lower end of the coil (32) is connected to the pipe (34), serves as a protection against the faulty operation of the valve (27) controlled by the float (21) in the float tank (20). In the event that this valve (27) fails to close properly, and water was permitted to fill up the evaporating tank (19) and to rise up in the pipe (23), extending from the float tank (20) to the top of the heater, the water would flow across through the pipe (35) and down into the surge tank (8) causing the float in that tank to be raised and close the valve (26) which it controls.

The automatic principle embodied in the operation of the distilling equipment can readily be perceived by tracing the functions of all the component parts.

After the heater is in operation, the quantity of distilled water contained therein, is slowly but constantly being reduced through evaporation, and the level attained in the surge tank (8) as the water fluctuates up and down, gradually becomes lower, allowing the float (28) in the surge tank (8) to continue dropping. At the same time, the quantity of water in the evaporating tank (19) will be gradually transformed into vapor, which will rise up through pipe (31) to the coil (32) at the top of the heater and upon being condensed, drop down into the surge tank (8) as distilled water. When enough of the water in the vaporizing chamber (19) has been steamed off to allow the float (21) in the float tank (20) to drop to a predetermined minimum position, the valve (27) which is controlled by this float (21) will be opened. No water will, however, be permitted to flow into the evaporating tank (19) from the hot water outlet (5) until valve (26) is also opened. But when the level of the distilled water in the surge tank (8) drops to such a point that an increased supply is desirable to ensure satisfactory operation, this fact will be determined by the float (28) reaching such a position that the valve (26) is opened. As shown above, the valve (27) will also be in the open position, since the level of the water in the float tank (20) will have reached the point where the float (21) will have operated to open this valve (27).

With both valves (26) and (27) open, water will pass freely through the feed pipe (25) connecting the hot water outlet (5) with the float tank (20) until the level in the vaporizing chamber (19) has been raised to the point where the float (21) in the float tank (20) will cause the valve (27) to close. The water in the evaporating chamber (19) will then pass through the distilling process and when enough has been vaporized to allow float (21) to drop and open the valve (27), more water will then be allowed to enter the evaporating chamber.

This action will continue as long as more distilled water is required in the surge tank (8) to bring the level up to a point where the float (28) will be raised to its maximum position, and the valve (26) will be closed. Meanwhile, the water in the evaporating chamber (19) will be steamed away, allowing the float (21) to go on dropping until the valve (27) will again be opened. Thus, when the quantity of distilled water in the surge tank (8) will have been diminished to such an extent, that an increased supply is again desirable, the float (28) will reach its minimum and open the valve (26). Since the valve (27) is already open, more water can flow into the vaporizing chamber (19), and the process of distillation will continue until the quantity has been sufficiently augmented, when the valve (26) will be closed, and further generation of distilled water will be checked, until more is required. It will be seen then that the function of the float valve (26) is to open the supply line to the evaporating chamber as soon as the quantity of water in the heating chamber and surge tank has fallen below a predetermined minimum, while the float valve 27 serves to prevent too much feed water passing to the evaporating tank.

From the description of the complete heater, as set forth above, it will be seen that the feature of automatic control prevails throughout the entire operation. The volume of electric current used in heating the water supply, is automatically regulated by the surging of the distilled water in the heating unit (2) and the quantity of this distilled water is maintained at its normal level by the automatically controlled distilling apparatus.

What I claim as my invention is:

1. An electric water heater comprising a supply tank; a closed heating chamber positioned therein and spaced from the side walls thereof; a surge tank within the supply tank but separated therefrom and positioned above the heating chamber; a surge pipe extending from the lower part of the heating chamber to the lower part of the surge tank; and depending electrodes positioned in the heating chamber, the surge tank being adapted to returnably contain water displaced from the heating chamber by steam formed therein.

2. An electric water heater comprising a supply tank; a closed heating chamber positioned therein; a surge tank within the supply tank but separated therefrom and positioned above the heating chamber, the surge tank and chamber being separated by an electrode carrying partition; electrodes carried by and insulated from said partition and depending in the heating chamber; electrode terminals at the upper side of the partition; an electrode terminal housing protecting said terminals from contact with water in the surge tank; a conduit for electrical connections extending through the surge tank to the housing; and a surge pipe extending from the lower part of the heating chamber to the lower part of the surge tank.

3. An electric water heater comprising a closed cylindrical supply tank having an annular upper end; a cylindrical shell extending through and connected with the inner periphery of said annular end; a partition in said shell above its lower end; a closed heating chamber of less diameter than the aforesaid shell depending from the partition; an annular closure forming with the lower part of the shell and the upper part of the wall of the heating chamber an annular evaporating chamber; depending electrodes in the heating chamber; a surge pipe extending from the lower part of the heating chamber to the lower part of the surge tank; a pipe leading from the upper part of the evaporating chamber to the outside of the apparatus; and a condensing coil in said pipe communicating with the surge tank.

4. An electric water heater comprising a supply tank containing a liquid to be heated; a closed heating chamber positioned in the supply tank containing distilled water; and electric means adapted to heat the water in the said chamber and to generate steam; and means for condensing steam thus generated and for leading the water of condensation into the said chamber to make up waste.

5. An electric water heater comprising a supply tank containing a liquid to be heated; a closed heating chamber positioned in the supply tank containing distilled water; electric means adapted to heat the water in the said chamber and to generate steam; and means for condensing steam thus generated and for leading the water of condensation into the said chamber to make up waste; and a surge tank open at its top to the atmosphere and connected to the heating chamber to receive water displaced therefrom by the accumulation of steam within the heating chamber.

6. An electric water heater comprising a supply tank containing a liquid to be heated; a closed heating chamber positioned in the supply tank containing distilled water; electric means for heating the water in the said chamber and indirectly the liquid in the tank by conduction through the heater walls; a surge tank open at its top to the atmosphere and connected to the heating chamber to receive water displaced therefrom by the accumulation of steam within the heating chamber; an evaporating chamber adjacent the heating chamber; a pipe leading from the upper part of the evaporating chamber to the outside of the aparatus; and a condensing coil in said pipe communicating with the surge tank.

7. An electric water heater comprising a closed cylindrical supply tank having an annular upper end; a cylindrical shell extending through and connected with the inner periphery of said annular end; a partition in said shell above its lower end; a closed heating chamber of less than the aforesaid shell depending from the partition; an annular closure forming with the lower part of the shell and the upper part of the wall of the heating chamber an annular evaporating chamber; depending electrodes in the heating chamber; a surge pipe extending from the lower part of the heating chamber to the lower part of the surge tank; a pipe leading from the upper part of the evaporating chamber to the outside of the apparatus; a condensing coil in said pipe communicating with the surge tank; and means for automatically supplying feed water to the evaporating chamber when the minimum water level in the surge tank falls too low.

8. An electric water heater comprising a supply tank containing a liquid to be heated; a closed heating chamber positioned in the supply tank containing distilled water; electric means for heating the water in the said chamber and indirectly the liquid in the tank by conduction through the heater walls; a surge tank open at its top to the atmosphere and connected to the heating chamber to receive water displaced therefrom by the accumulation of steam within the heating chamber; an evaporating chamber adjacent the heating chamber; a pipe leading from the upper part of the evaporating chamber to the outside of the apparatus; a condensing coil in said pipe communicating with the surge tank; and means for automatically supplying feed water to the evaporating chamber when the minimum water level in the surge tank falls too low.

9. An electric water heater comprising a closed cylindrical supply tank having an annular upper end; a cylindrical shell extending through and connected with the inner periphery of said annular end; a partition in said shell above its lower end; a closed heating chamber of less than the aforesaid shell depending from the partition; an annular closure forming with the lower part of the shell and the upper part of the wall of the heating chamber an annular evaporating chamber; depending electrodes in the heating chamber; a surge pipe extending from the lower part of the heating chamber to the lower part of the surge tank; a pipe leading from the upper part of the evaporating chamber to the outside of the apparatus; a condensing coil in said pipe communicating with the surge tank; means for automatically supplying feed water to the evaporating chamber when the minimum water level in the surge tank falls too low; and means for automatically shutting off the supply of feed water if the water level in the evaporating chamber rises too high.

10. An electric water heater comprising a supply tank containing a liquid to be heated; a closed heating chamber positioned in the supply tank containing distilled water; electric means for heating the water in the said chamber and indirectly the liquid in the tank by conduction through the heater walls; a surge tank open at its top to the atmosphere and connected to the heating chamber to receive water displaced therefrom by the accumulation of steam within the heating chamber; an evaporating chamber adjacent the heating chamber; a pipe leading from the upper part of the evaporating chamber to the outside of the apparatus; a condensing coil in said pipe communicating with the surge tank; means for automatically supplying feed water to the evaporating chamber when the minimum water level in the surge tank falls too low; and means for automatically shutting off the supply of feed water if the water level in the evaporating chamber rises too high.

11. An electric water heater comprising a supply tank; a closed heating chamber positioned therein; a surge tank within the supply tank but separated therefrom and positioned above the heating chamber; a surge pipe extending from the lower part of the heating chamber to the lower part of the surge tank; depending electrodes positioned in the heating chamber; an evaporating chamber adjacent the heating chamber; a pipe leading from the upper part of the evaporating chamber to the outside of the apparatus; a condensing coil in said pipe communicating with the surge tank; and means for automatically supplying feed water to the evaporating chamber when the minimum water level in the surge tank falls too low.

12. An electric water heater comprising a supply tank; a closed heating chamber positioned therein; a surge tank within the supply tank but separated therefrom and positioned above the heating chamber; a surge pipe extending from the lower part of the heating chamber to the lower part of the surge tank; depending electrodes positioned in the heating chamber; an evaporating chamber adjacent the heating chamber; a pipe leading from the upper part of the evaporating chamber to the outside of the apparatus; a condensing coil in said pipe communicating with the surge tank; means for automatically supplying feed water to the evaporating chamber when the minimum water level in the surge tank falls too low; and means for automatically shutting off the supply of feed water if the water level in the evaporating chamber rises too high.

13. An electric water heater comprising a supply tank containing a liquid to be heated; a closed heating chamber positioned in the supply tank containing distilled water; electric means for heating the water in the said chamber and indirectly the liquid in the tank by conduction through the heater walls; a surge tank open at its top to the atmosphere and connected to the heating chamber to receive water displaced therefrom by the accumulation of steam within the heating chamber; an evaporating chamber adjacent the heating chamber; a pipe leading from the upper part of the evaporating chamber to the outside of the apparatus; a condensing coil in said pipe communicating with the surge tank; and means for automatically supplying feed water to the evaporating chamber when the minimum water level in the surge tank falls too low comprising a feed pipe leading from the upper part of the supply tank to the evaporating chamber, and a float valve controlled by the minimum water level of the surge tank.

14. An electric water heater comprising a supply tank containing a liquid to be heated; a closed heating chamber positioned in the supply tank containing distilled water; electric means for heating the water in the said chamber and indirectly the liquid in the tank by conduction through the heater walls; a surge tank open at its top to the atmosphere and connected to the heating chamber to receive water displaced therefrom by the accumulation of steam within the heating chamber; an evaporating chamber adjacent the heating chamber; a pipe leading from the upper part of the evaporating chamber to the outside of the apparatus; a condensing coil in said pipe communicating with the surge tank; and means for automatically supplying feed water to the evaporating chamber when the minimum water level in the surge tank falls too low comprising a feed pipe leading from the upper part of the supply tank to the evaporating chamber; a float valve controlled by the minimum water level of the surge tank; and a float valve controlled by the maximum water level of the evaporating chamber to prevent overfeeding of the evaporating chamber.

15. An electric water heater comprising a supply tank containing a liquid to be heated; a closed heating chamber positioned in the supply tank containing distilled water; electric means for heating the water in the said chamber and indirectly the liquid in the tank by conduction through the heater walls; a surge tank open at its top to the atmosphere and connected to the heating chamber to receive water displaced therefrom by the accumulation of steam within the heating chamber; an evaporating chamber adjacent the heating chamber; a pipe leading from the upper part of the evaporating chamber to the outside of the apparatus; a condensing coil in said pipe communicating with the surge tank; and means for automatically supplying feed water to the evaporating chamber when the minimum water level in the surge tank falls too low comprising a feed pipe leading from the upper part of the supply tank to the evaporating chamber; a float valve controlled by the minimum water level of the surge tank; a float valve controlled by the maximum water level of the evaporating chamber to prevent overfeeding of the evaporating chamber; and an overflow from the feed pipe to the surge tank.

16. An electric water heater comprising a supply tank; a heating chamber communicating with the atmosphere and enclosing a body of distilled water separate from any liquid contained in the supply tank; electric means for heating the distilled water; an evaporating chamber adjacent the heating chamber; a pipe leading from the upper part of the evaporating chamber to the outside of the apparatus; and a condensing coil in said pipe supplying condensed water to the heating chamber.

17. An electric water heater comprising a supply tank; a heating chamber enclosing a body of distilled water separate from any liquid contained in the supply tank; a surge tank with which the heating chamber communicates; electric means for heating the distilled water; an evaporating chamber adjacent the heating chamber; a pipe leading from the upper part of the evaporating chamber to the outside of the apparatus; a condensing coil in said pipe communicating with the surge tank; and means for automatically supplying feed water to the evaporating chamber when the minimum water level in the surge tank falls too low.

18. An electric water heater comprising a supply tank; a heating chamber enclosing a body of distilled water separate from any liquid contained in the supply tank; a surge tank with which the heating chamber communicates; electric means for heating the distilled water; an evaporating chamber adjacent the heating chamber; a pipe leading from the upper part of the evaporating chamber to the outside of the apparatus; a condensing coil in said pipe communicating with the surge tank; means for automatically supplying feed water to the evaporating chamber when the minimum water level in the surge tank falls too low; and means for automatically shutting off the supply of feed water if the water level in the evaporating chamber rises too high.

19. An electric water heater comprising a supply tank; a closed heating chamber positioned therein; a surge tank within the supply tank but separated therefrom and positioned above the heating chamber; a surge pipe extending from the lower part of the heating chamber to the lower part of the surge tank; depending electrodes positioned in the heating chamber; a valve-controlled vent pipe leading from the top of the heating chamber; and a breather pipe leading from the upper part of the surge tank.

MATTHEW W. KIRKWOOD.